July 31, 1951          A. SAXER          2,562,643
MULTIPLE HAMMER
Filed Aug. 7, 1947
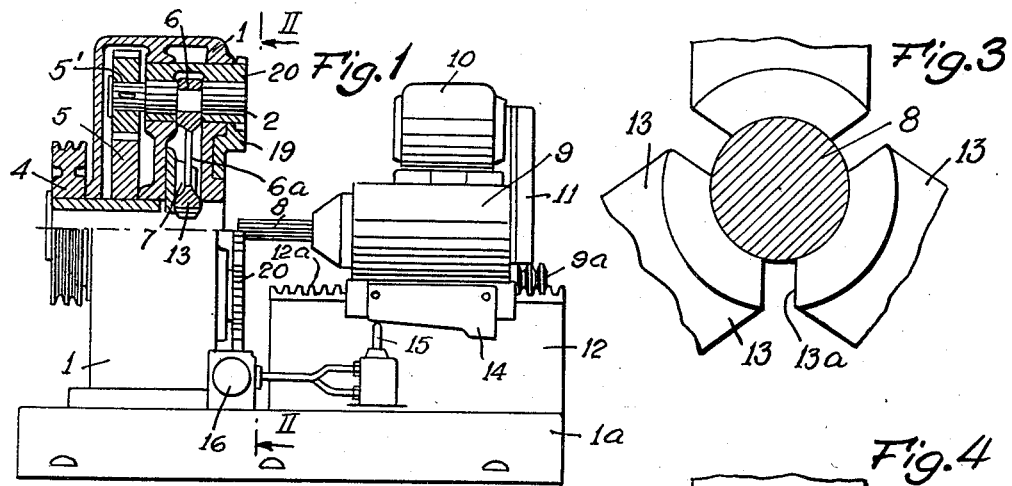
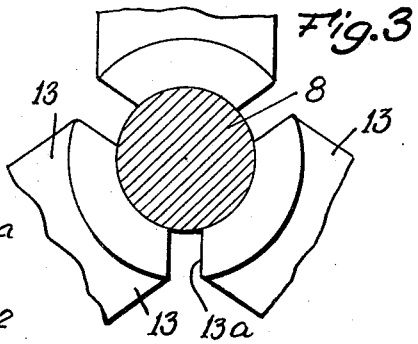
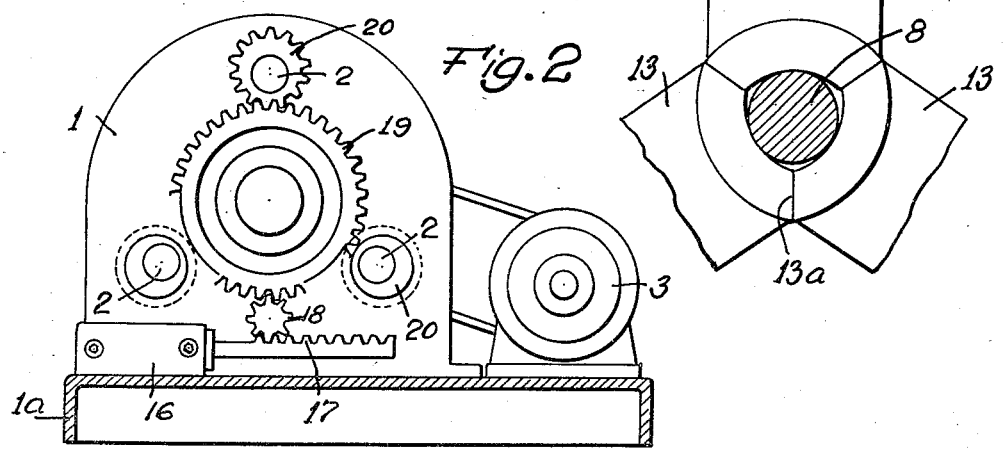
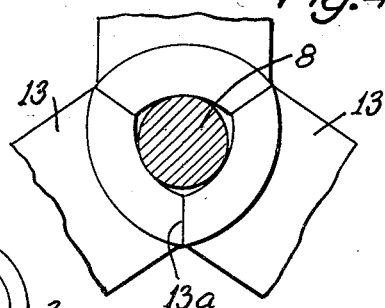
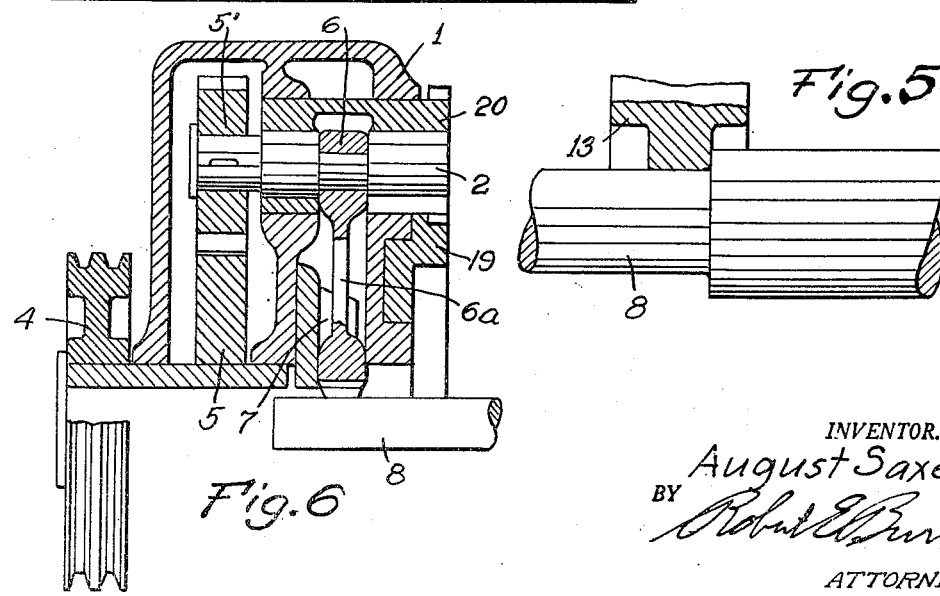
INVENTOR.
August Saxer
BY
ATTORNEY

Patented July 31, 1951

2,562,643

UNITED STATES PATENT OFFICE 2,562,643

MULTIPLE HAMMER

August Saxer, Thalwil, Zurich, Switzerland

Application August 7, 1947, Serial No. 767,184
In Austria November 13, 1946

5 Claims. (Cl. 78—22)

The technique of forming work-pieces and especially parts of axial symmetrical shape and round section, like shafts and similar elements plays an important part among fabrication methods. Usually the process of cutting is used, whereby the work-piece is formed on a lathe of specified dimensions and output. Thus the method of cutting and smoothing is used. This process has the disadvantage of cutting away the surplus material which results in the cutting of the fibre structure. This fibre structure in some cases may be essential for imparting strength to the article. Complicated shapes require many machine-hours and man-hours and are costly.

For special work another method is used whereby work-pieces are forged in swages and/or dies. Here the negative form of the swages is used to hammer or press the material in one or two steps into the approximate shape of the finished article. This is done with one or two hammer-blows and/or pressings and by ordinary forging or with presses of the desired shape. As it is impossible to give the work-piece the exact outline dimensions by ordinary forging and/or pressing, it is necessary to put it on the lathe for finishing after the burrs have been removed. Thus the forging with swages is relatively uneconomical and has the additional disadvantages of requiring a great amount of material and working-hours.

There are also known other methods to form such work-pieces by jumping-up on a forging machine. In such cases, the processing is done co-axially either without or with swages. This method calls for expensive tools, requires appreciable working-hours and only for the fabrication of nails is quick action and high output obtained.

It has been desired to solve these problems of fabricating such pieces without the necessity of resorting to cutting.

My invention relates to such a process, which operates on the principle that all forming is done by a quick sequence of partial forming and without swages and/or dies up to the finished product. The dimensions of the latter are controlled by gauges.

A further object of my invention is the possibility that the work-piece can be moved during the process of forming in an axial and in a circumferential direction. The depths of the partial formings, which are axially and radially arranged along the surface, are automatically controlled by gauges, which take into account the lengthening of the work-piece under processing. Besides this gauge control, the axial and the radial feed of the material is also controlled.

The arrangement of my invention is such, that several hammer-shaped tools and/or punches are distributed along the circumference of the work-piece, which are guided by parallel brackets and driven by sheaves. These sheaves can also be regulated by means of eccentric journals to control the depth of the movement of the tools.

The drive of all hammering tools is planetary and arranged in a circle, in such manner that they can be driven by a single and common centrally located shaft. The control of the workings depth of the tools, i. e. the crank of the sheaves, is also operated from a common mechanism. This consists of a ring with hydraulic maneuvering. This latter is built in the manner of a regulating cylinder with piston, the position of which is controlled by a servomotor, connected to a guide-finger which moves along a former-bar and thus regulates the working depth of the hammers. The former-bar can be exchanged to suit the shape of the product to be fabricated.

It can thus be seen that my invention is based on the principle that several hammers, i. e. three of four, which are quick acting and driven by sheaves and arranged concentrically around the work-piece, impress grooves into this work-piece. These grooves are circumferential and similar to a thread of minimum pitch.

The hammering action reduces the diameter of the work-piece and consequently produces a lengthening thereof. In this way it is possible to reduce the diameter to conical and/or cylindrical shapes, with or without necks.

The purpose of this arrangement and process is to reduce a rough work-piece of larger diameter than the finished piece to approximately final form and shape by quick forging and/or quick pressing, only the tolerances for smoothing or grinding being necessary thereafter. For this purpose the work-piece has to make a radial and an axial movement in relation to the tools. Both motions must be so correlated, that the single pressings follow each other closely and sometimes overlap in order to insure a reduction in diameter and form grooves in the article operated on. The depth of these grooves, made by the single pressings control the reduction in diameter of the work-piece. Since the latter depends on the finished form and shape, it is essential to control the depth to which the tools work.

The advantages of this method and arrangement shall be further explained by reviewing the known methods of turning on a lathe, forging, jumping-up and similar processes.

Compared to ordinary turning and roughing, my invention has the advantage that it requires less time and furthermore no material is lost by cuttings. It also imparts a better alignment of the fibres and thus greater strength thereto, which is augmented by the fact that no fibres are cut. Instead, they will be compressed.

In comparison to swaging, it can be said that the finished work-pieces have, according to my process, a more accurate shape, needing only the tolerances for smoothing and/or grinding, whereas with the swaging process roughing is required. Consequently almost no material is lost by the finishing operations and the time of machining is shortened. In addition no expensive swages and/or dies are required, only a former-bar of inexpensive plate is needed.

Finally in comparison to the known methods of jumping-up and of forging in forging machines, my invention has the advantage that the expensive tools are dispensed with and only a simple former-bar is utilized. Furthermore, the process of many partial formings in quick sequence reduces the necessary forces to produce such formings and thus requires smaller, lighter and less expensive machinery. Due to these advantages it is possible to use the process also for smaller amounts of finished parts.

The accompanying drawing shows examples of my invention, in which:

Fig. 1 is a cross-section of the machine tool;

Fig. 2 is a section along the line II—II of Fig. 1 showing the action of the stroke control;

Figs. 3, 4 and 5 are detail views on a large scale, showing the processing actions;

Fig. 6 is an enlarged view illustrating the upper left hand portion of Fig. 1.

Referring to said drawings, 1a is the bed-plate of the entire machine-tool. It has two uprights 1 and 12. In the upright 1 three shafts 2 and sheaves 6 are mounted in eccentric journals, which are driven by a common motor 3, V-belted wheel 4 and a pair of cog-wheels 5—5. The sheaves 6 with connecting rods 6a are guided by brackets 7 and actuate all tools 13 simultaneously and intermittently, respectively, toward and from the work-piece 8. The latter is fixed to a slide 9 and rotated by motor 10 and reduction gear 11. This arrangement slides on the second upright 12 and moves in the direction of the tools.

Figs. 3, 4 and 5 illustrate the working of the tools 13. In Fig. 3, three of such tools are shown at the beginning of the operation. Their radius corresponds to the diameter of the rough and untreated work-piece at the beginning of the process. Figs. 4 and 5 show a cross-section and side-view at the end of processing, when forming the smallest possible diameter. Here the tools 13 touch each other with their inclined flanks 13a and surround the finished work-piece in a sicklelike manner. The tools are now controlled in the depth of their reach between this end position and the starting position as shown in Fig. 3. For this purpose, the slide 9 carries the former-bar 14 from which a hydraulic guide-finger 15 takes the regulating valve-control position to actuate the servo-motor 16. This operates, in turn, by means of rack 17, pinion 18, on the ring 19. This ring has on its outer side cogs which engage with the eccentrical journals, boxes 20 in which the shafts of the sheaves travel.

The turning of these journals-boxes 20, by means of the described mechanism (i. e., the hydraulic servo-motor) changes the distance of the centers of these bearings in relation to the common center of the whole machinery and the work-piece 8, thus regulating the reach in depth of the tools 13 in accordance with the shape of the former-bar. The latter has to be altered to take into account the lengthening during processing. In the drawing as shown, the change in distance of the cog-wheel centers 5—5 is accounted for by extremely high flanked cogs and clearances.

The processing as herein described permits the fabrication of parts which have a sequence of cylindrical and conical outlines. If there are necks to be made, then the working-depth of the tools is changed, according to the required diameter, with the slide 9 idling. After the change has been made, the movement of the slide is resumed. The necessary auxiliary arrangements for this purpose are generally known and form no part of this invention. The same holds true for the fabrication of radial grooves, which are made with idling axial movement, but turning work-piece and increased depth of the tools.

Soft materials or small changes in shape can be made at normal temperature. Hard steels and larger changes in shape are processed at forging temperature.

If the tools have surfaces of certain and special profile, it is possible with my process to impress on the surface of the work-piece, grooves and/or flutes or collars. For this purpose, the special design of the slide-blocks which forms the subject of another application, not herein claimed, is of special advantage.

What I claim as new and desire to secure by Letters Patent is:

1. Apparatus for forming work-pieces by a forging operation comprising a frame having a central opening for a work-piece, a plurality of eccentric journals rotatably mounted in said frame with their axes parallel to one another and to the longitudinal axis of the work-piece, said journals being uniformly distributed around the work-piece, shafts rotatably supported in said journals, an eccentric on each of said shafts, a tool carrier rotatably connected with said eccentric, a tool carried by said carrier and adapted to be reciprocated by said eccentric to strike the work and means for adjustably turning said journals to regulate the working depth of said tools.

2. Apparatus for forming work-pieces by a forging operation comprising a frame having a central opening for a work-piece, a plurality of eccentric journals rotatably mounted in said frame with their axes parallel to one another and to the longitudinal axis of the work-piece, said journals being uniformly distributed around the work-piece, shafts rotatably supported in said journals, an eccentric on each of said shafts, a tool carrier rotatably connected with said eccentric, a tool carried by said carrier and adapted to be reciprocated by said eccentric to strike the work, a regulating ring rotatably supported by said frame, means for turning said ring and driving connections between the ring and each of said journals to turn all of said journals in unison and thereby regulate the working depth of all of said tools.

3. Apparatus for forming work-pieces by a forging operation comprising a frame having a central opening for a work-piece, a plurality of eccentric journals rotatably mounted in said frame with their axes parallel to one another and to the longitudinal axis of the work-piece, said journals being uniformly distributed around the work-piece, shafts rotatably supported in said journals, an eccentric on each of said shafts, a tool carrier rotatably connected with said eccentric, a tool carried by said carrier and adapted to be reciprocated by said eccentric to strike the work, means for moving the work axially during reciprocation of said tools and means for adjustably turning said journals in timed relation with the axial movement of the work to vary the working depth of said tools.

4. Apparatus for forming a work-piece by forging comprising a frame having a central opening for a work-piece, a plurality of tools uniformly disposed around the work-piece, means for reciprocating the tools in unison toward and away from the work, a sliding carriage, a work carrier rotatably mounted on said carriage, means for rotating said carrier, means for moving the carriage to move the work-piece in an axial direction relative to said tools, means responsive to the movement of said carriage for varying the working depth of all of said tools in unison.

5. Apparatus for forming a work-piece by forging comprising a frame having a central opening for a work-piece, a plurality of tools uniformly disposed around the work-piece, means for reciprocating the tools in unison toward and away from the work, a sliding carriage, a work carrier mounted on said carriage, means for moving the carriage to move the work-piece in an axial direction relative to said tools, means responsive to the movement of said carriage for varying the working depth of all of said tools in unison.

AUGUST SAXER.

REFERENCES CITED

The following references are of record in the file of this patent:

UNITED STATES PATENTS

| Number | Name | Date |
|---|---|---|
| 1,180,296 | Johanson | Apr. 25, 1916 |
| 1,998,939 | Mittag | Apr. 23, 1935 |

FOREIGN PATENTS

| Number | Country | Date |
|---|---|---|
| 13,880 | Netherlands | Sept. 16, 1925 |